United States Patent Office 3,632,518
Patented Jan. 4, 1972

3,632,518
STANNOUS SALT CORRECTIVE AGENT FOR DIAZOTYPE COPIES
Dieter Bohm, Niederwalluf, Rheingau, Germany, assignor to Keuffel & Esser Company, Hoboken, N.J.
No Drawing. Filed Dec. 18, 1968, Ser. No. 784,889
Claims priority, application Germany, Dec. 27, 1967, P 15 97 632.6
Int. Cl. G03c 11/12
U.S. Cl. 252—188
10 Claims

ABSTRACT OF THE DISCLOSURE

A corrective or eradicating agent for diazotype copy comprises a solution of a stannous salt reducing agent and a strong acid in an aqueous solvent mixture comprising an organic solvent at least partially miscible with water and a halogenated hydrocarbon solvent.

BACKGROUND OF THE INVENTION

Corrective agents for diazotype copies, by means of which selected areas of the azo dyestuff image may be removed or obliterated, are generally known. They are used in particular for correcting intermediate copies, e.g. of engineering drawings, on transparent copying materials.

In most cases, these corrective agents contain oxidizing or reducing substances capable of decolorizing the azo dyestuffs. Potassium permanganate has been suggested, e.g., as oxidizing agent. This substance has the disadvantage that black manganese dioxide is formed during its application, which, in turn, must be decolorized by a further agent.

Reagents containing tin chloride in a hydrochloric acid solution are widely used in practice as reducing agents. In order to facilitate penetration of the solution into the layer containing the azo dyestuff and dissolution of the dyestuff itself, such solutions contain, besides water, water-miscible organic solvents.

The use of these agents has involved various disadvantages. For example, for the correction of lacquered films or papers, the time of action has normally been relatively long. To improve the activity of such agents, other solvents have been added to the solutions, e.g. esters, which accelerate the penetration into the lacquer layer and the dissolution of the dyestuff. However, solutions of this kind had the disadvantage that they spread normally with undesirable speed over the surface of the layer, thus causing an unintentional obliteration in the vicinity. On the other hand, the solutions containing such esters have a tendency to change during storage, due to saponification or re-esterification reaction.

Japanese patent application No. 13,945/66 describes a corrective agent containing stannous chloride, aqueous hydrochloric acid, ammonium hydrogen fluoride, and an organic solvent, e.g. acetone or alcohol. However, it is pointed out in the patent application that the solution must be handled with care because of the hydrofluoric acid contained therein.

Further, it has been suggested to do without the reducing agent and the aqueous component and to use instead only a mixture of organic solvents by which the azo dyestuff is dissolved away from the layer. Of course, this method does not lead to a complete decoloration by a single application. Further, there is a risk that the lines may bleed.

DESCRIPTION OF THE INVENTION

The present invention comprises a corrective agent for diazotype copies and includes a stannous salt, a strong acid, and, as the solvent, a mixture of water and organic solvents.

The corrective agent according to the invention is characterized in that the organic solvent consists of a mixture of at least one solvent that is at least partially miscible with water and at least one halogenated hydrocarbon.

Stannous chloride is preferred as stannous salt, in combination with hydrochloric acid as the strong acid.

The following substances are suitable as organic solvents which are at least partially miscible with water: lower aliphatic alcohols, such as methanol, ethanol, n-propanol, isopropanol, or tert.-butanol; lower aliphatic ketones, such as acetone, methylethyl ketone, methyl isopropyl ketone, and the like; polyhydric alcohols, such as ethylene glycol, butylene glycol, glycerol, and the partial etherification products thereof, such as diethylene glycol, triethylene glycol, glycol monomethyl ether, glycol monoethylether, and others. The solvent should be selected such that it undergoes practically no chemical reaction in the strongly acid aqueous solution.

Suitable halogenated hydrocarbons are aliphatic, cycloaliphatic and aromatic compounds containing one or more halogen atoms in their molecules, such as, e.g.: trichloro ethylene, chloroform, carbon tetrachloride, dichloromethane, dichloroethane, 1.2-dichloropropane, chlorobenzene, o-dichlorobenzene, cyclohexyl chloride, ethyl bromide, 1.2-dibromoethane, 2-bromo-propane, 2-bromo-1-chloropropane, bromobenzene and the like. On account of their low price, the chlorinated hydrocarbons are normally preferred.

Advantageously, the stannous salt should be present in the corrective solution in a concentration between about 10 and 30 percent by weight; concentrations in the range of about 20 to 25 percent by weight will be generally preferred.

The quantity of acid should be at least sufficient to dissolve the stannous salt without hydrolysis. For this purpose, normally about 10 to 20 percent by weight, based on the total weight of the solution of concentrated aqueous hydrochloric acid will be sufficient. The quantity of water contained in the concentrated hydrochloric acid is sufficient for the purposes of the present invention, but solutions containing an additional quantity of water corresponding to 1 to 1.5 times the volume of concentrated hydrochloric acid present are also suitable.

The solution should advantageously contain at least about 1 percent by weight of halogenated hydrocarbon. A particularly good effect is achieved with a content from about 5 to about 10 percent. Larger quantities of halogenated hydrocarbons are possible, but are not normally accompanied by an improved effect. In the case of quantities exceeding about 20 percent by weight, the tendency of the hydrocarbon to separate from the solution increases to an impractical degree.

The remainder of the solution consists of a solvent or solvent mixture which is miscible with water and halogenated hydrocarbons in the proportions stated. Advantageously, the solvent mixture should contain a certain proportion, e.g. about 10 to 25 percent by volume, of higher boiling point solvents of higher viscosity, such as polyhydric alcohols, in order to further limit the spreading tendency of the solution.

PREFERRED EMBODIMENTS

In the tests described in the following examples, the corrective agent according to the invention was applied dropwise to the area of the copy to be corrected and allowed to act upon it for some time. After complete disappearance of the lines, any excess solution was dabbed off with filter paper or the like. The duration of action depends upon the nature of the azo dyestuff and the reproduction layer. In the case of very readily soluble and reducible dyestuffs, or of easily swellable materials, a few seconds are sufficient. For the treatment of less easily attackable dyestuffs and relatively thick, not easily swellable lacquer layers, times of action of up to 1½ minutes may be required until the lines have completely disappeared.

For performing the following examples, a reproduction material was used which was particularly hard to treat, because in this case the required times of action could be more easily ascertained.

PREPARATION OF THE COPY

Transparent paper was sensitized with a solution having the following comoposition:

3.0 g. of citric acid
2.8 g. of 2,5-dimethyl-6-morpholinomethyl-phenol (hydrochloride)
4.0 g. of thiourea
3.0 ml. of glacial acetic acid
2.0 ml. of isopropanol
3.9 g. of 2,5-diethoxy-4-morpholino-benzene-diazonium-tetrafluoborate
4.0 g. of zinc chloride
0.04 g. of saponin in
100.0 ml. of water.

The sensitized material was developed to complete azo dye formation in the normal manner with ammonia. One drop each of the different corrective solutions described below were applied to different spots on the surface of the dyed sheet thus produced, and the time, i.e. eradication period, was measured until the dyestuff had completely disappeared.

EXAMPLE 1

This example was carried through for comparison purposes, and the corrective solution used did not contain the addition of a halogenated hydrocarbon as required by the present invention. A solution was prepared from the following components:

20.0 g. of $SnCl_2.2H_2O$
12.0 ml. of concentrated hydrochloric acid
10.0 ml. of distilled water
4.0 ml. of isopropanol
16.0 ml. of ethyleneglycol monomethylether
20.0 ml. of methylethyl ketone
8.0 ml. of triethylene glycol
2.0 ml. of glycerol and filled up with methylethyl ketone to a total of 82 ml. An eradication period of 130 seconds was required until the dyestuff disappeared completely in the area of the applied drop.

EXAMPLES 2 TO 6

Before it was filled up with methylethyl ketone, 5 ml. of each of the halogenated hydrocarbons mentioned in the following table were respectively added to a separate solution described in Example 1, and the solution was then filled up to 82 ml. with methylethyl ketone. The eradication times measured are given in the table:

| Example number | Halogenated hydrocarbon | Time in seconds |
|---|---|---|
| 2 | Chloroform | 75 |
| 3 | Carbontetrachloride | 100 |
| 4 | Trichloroethylene | 70 |
| 5 | Methylenechloride | 60 |
| 6 | Chlorobenzene | 75 |

The above examples have been presented for the purpose of illustration and should not be taken to limit the scope of the present invention. It will be apparent that the described examples are capable of many variations and modifications which are likewise to be included within the scope of the present invention as set forth in the appended claims.

What is claimed is:
1. A fluid corrective agent for diazotype copies consisting essentially of a mixture of:
   (a) at least about 10% by weight of a stannous salt which is soluble in an acidic aqueous medium;
   (b) at least about 10% by weight of a strong inorganic acid;
   (c) at least about 1% by weight of a halogenated hydrocarbon solvent selected from the group consisting of lower alkane, lower cycloalkane, lower alkene, and benzene compounds;
   (d) at least sufficient water to effect solution of said stannous salt; and
   (e) the balance of at least one substantially water-miscible organic solvent selected from the group consisting of lower aliphatic alcohols, lower aliphatic ketones, polyhydric alcohols, and partial etherification products of polyhydric alcohols.
2. A corrective agent according to claim 1 wherein said stannous salt is stannous chloride.
3. A corrective agent according to claim 2 wherein said acid is hydrochloric acid.
4. A corrective agent according to claim 3 wherein said salt is present in an amount between about 10% and 30% by weight, and said acid is present in an amount between about 10% and 20% by weight.
5. A corrective agent according to claim 1 wherein said halogenated solvent is chlorinated.
6. A corrective agent according to claim 3 wherein said chlorinated solvent is selected from the group consisting of chloroform, carbontetrachloride, trichloroethylene, methylene chloride, and chlorobenzene.
7. A corrective agent according to claim 3 wherein said chlorinated solvent is present in an amount between about 1% and 20% by weight.
8. A corrective agent according to claim 1 wherein said balance comprises at least one polyhydric alcohol.
9. A corrective agent according to claim 5 wherein said at least one polyhydric alcohol is present in an amount between about 5% and 20% by weight.
10. An image eradicating fluid for diazotype copies consisting essentially of a mixture of:
   (a) between about 20% and 25% by weight stannous chloride;
   (b) between about 10% and 20% by weight hydrochloric acid;
   (c) between about 5% and 10% by weight of a chlorinated hydrocarbon solvent selected from the group consisting of lower alkane, lower cycloalkane, lower alkene, and benzene compounds;
   (d) at least sufficient water to effect a solution of said stannous salt; and
   (e) the balance consisting essentially of one or more substantially water-miscible organic solvents selected from the group consisting of lower aliphatic alcohols, lower aliphatic ketones, polyhydric alcohols and partial etherification products of polyhydric alcohols, said balance comprising one or more of said polyhydric alcohols in an amount between about 5% and 20% by weight of said eradicating fluid.

References Cited

UNITED STATES PATENTS 2,931,724  4/1960  Lantz _____ 252—188

FOREIGN PATENTS 13,945  4/1966  Japan _____ 96—49

RICHARD D. LOVERING, Primary Examiner
I. GLUCK, Assistant Examiner

U.S. Cl. X.R.
23—53, 98; 96—49